United States Patent

Baum

[15] 3,652,348

[45] Mar. 28, 1972

[54] LIQUIDS THICKENED WITH SUBMICROSCOPIC BETA-SILICON CARBIDE FIBER SHEATHED WITH SILICA

[72] Inventor: George Baum, Corning, N.Y.

[73] Assignee: Corning Glass Works, Corning, N.Y.

[22] Filed: June 9, 1967

[21] Appl. No.: 644,979

[52] U.S. Cl. ....................................149/36, 44/7 D, 149/3, 149/109, 149/110, 252/28

[51] Int. Cl. ........................................C10l 7/02, C06d 5/00

[58] Field of Search ..................44/7 D; 149/36, 109, 110, 3; 252/28

[56] References Cited

UNITED STATES PATENTS

| | | | |
|---|---|---|---|
| 3,294,702 | 12/1966 | Larsen | 44/7 D |
| 3,392,068 | 7/1968 | Knowles et al. | 149/21 |

*Primary Examiner*—Benjamin R. Padgett
*Attorney*—Clarence R. Patty, Jr. and Gerhard K. Adam

[57] ABSTRACT

This invention relates to a method for increasing the viscosity of polar and nonpolar liquids through the addition thereto of submicroscopic-sized fibers containing silica-sheathed, beta-silicon carbide crystals, said fibers having diameters averaging about 0.025 microns and aspect ratios greater than about 1,000:1.

10 Claims, 2 Drawing Figures

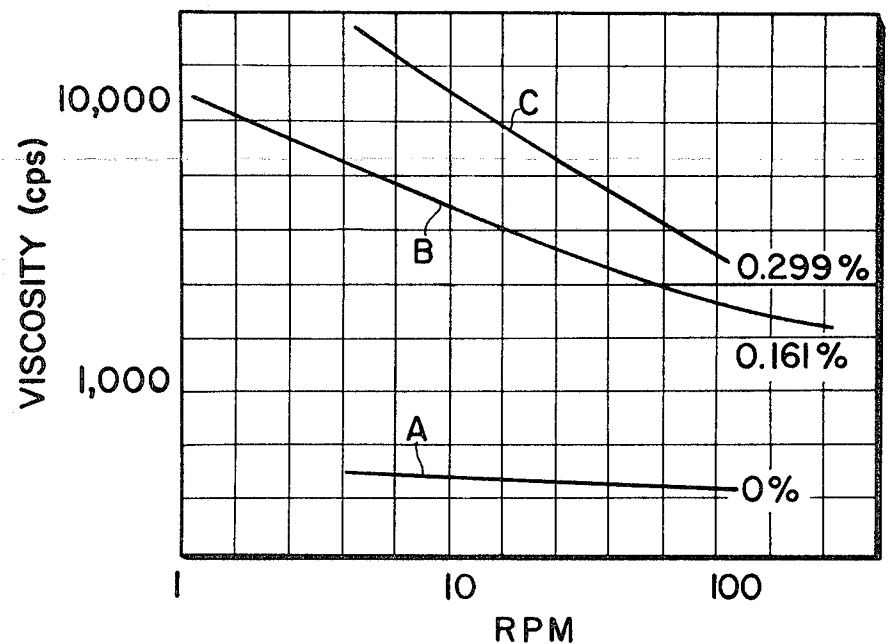
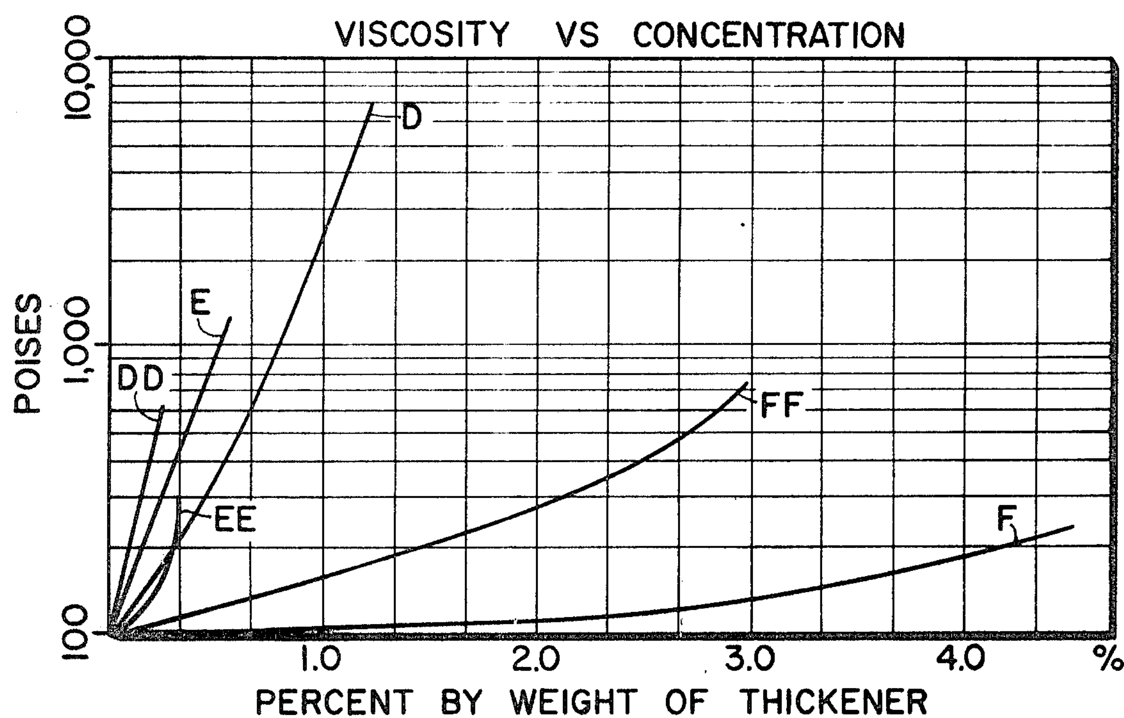
INVENTOR
GEORGE BAUM
BY Gerhard K. Adam
ATTORNEY

LIQUIDS THICKENED WITH SUBMICROSCOPIC BETA-SILICON CARBIDE FIBER SHEATHED WITH SILICA

It is a well known practice to increase the viscosity of liquids, especially organic liquids, by the addition of thickening agents. These agents are broadly of two general types, the organic thickeners such as salts of fatty acids, polyethylene oxides, and polymethylmethacrylates, and the inorganic thickeners such as bentonite clay, fine silicas, talc, and carbon black. Thickeners are used industrially to improve the performance of products including adhesives, epoxy resins, polyester resins, multipurpose greases, paints, silicon rubbers, pharmaceuticals, and many others.

In each specific application one should select the most suitable thickener having the least undesirable properties. Thus for example, organic soap thickeners have two principal disadvantages in that they have a finite melting point and a tendency, in some instances, to catalyze oxidation reactions at elevated temperatures. On the other hand, the inorganic thickening compounds, such as surface treated clays and the fine silicas, have virtually no melting point. Their thickening ability is dependent on their extremely fine particle size which gives them an enormous surface area in proportion to their weight. However, inorganic thickeners also have various shortcomings. Perhaps these are best illustrated in the manufacture of greases. Thus bentonite clays have the disadvantage of not being particularly effective in certain chemically active environments, they tend to harden the grease as worked by the bearings, and the particles tend to promote grease degradation by serving as nucleating sites for oxidation reactions. Disadvantages of the fine particulate silicas are that they tend to throw off oil, they have a tendency to cause clogging, and they provide relatively poor lubricity.

Quite surprisingly, I have discovered an improved method of thickening liquids by incorporating in the liquid a fibrous inorganic thickening agent. This agent is very effective in thickening protective coatings, gel coats, greases, epoxy resins, polyester resins etc. It is particularly effective for gelling fuels for jet planes and propellants used in liquid fueled rockets.

In accordance with the present invention, I have discovered an improved method of increasing the viscosity of liquids by dispersing in the liquids submicroscopic fibers of beta-silicon carbide crystals covered by a silica sheath. These fibers have an aspect ratio of about 1000:1 to about 40,000:1.

The copending application of W. W. Pultz, Ser. No. 438,578 filed on Mar. 3, 1965 and now U.S. Pat. No. 3,335,049, describes a method of making the novel thickening agent. Broadly charges of silica and carbon are heated to a critical temperature range in an atmosphere resulting from the introduction of carefully controlled partial pressures of an inert gas and carbon monoxide. The submicroscopic fibers containing silicon carbide crystals having diameters averaging about 0.025 microns and lengths up to 100 microns and sometimes longer are produced by initially mixing together the charge of silica and carbon in a molar ratio of 1:1–1:4. The mixture is transferred to a furnace and heated to a temperature of about 1,375°–1,575° C. for a time sufficient to obtain the desired fiber formation during which time a carefully controlled partial pressure of carbon monoxide along with, optionally, an inert diluent gas, e.g., hydrogen, helium, and argon, is introduced, the partial pressure of carbon monoxide ranging from about 5–500 mm. of mercury. For convenience, the total pressure within the regular system is held at one atmosphere although pressures lower or higher can be utilized.

The novel thickening agent is in the form of fibers which generally appear white with a bluish cast although in some instances a small area of yellowish fibers has been observed. The individual fibers are generally small and electron micrographs indicate that they have diameters averaging about 0.025 microns with lengths up to 100 microns and greater. Thus, the fibers have a maximum length to diameter ratio, the aspect ratio, of about 40,000:1. Examination of the fibers utilizing electron microscopy and X-ray diffraction analysis has shown that in general the fibers consist of a core of beta-silicon carbide and a surface sheath of silica. These fibers are easily dispersed in polar and nonpolar liquids. Hence, the thickening agent can be used to increase the viscosity of a wide variety of organic and inorganic liquids. The properties of the submicroscopic fibers of silica sheathed beta-silicon carbide crystals ($SiO_2$—SiC fibers) useable in the present invention are as follows:

1. Composition—beta-silicon carbide crystal covered with a sheath of silica, the ratio of silica to silicon carbide is about 3:1.

2. Shape—in the form of submicroscopic fibers.

3. Fiber Dimensions—the diameter of the fibers is an average of about 0.025 microns; the fiber length ranges from about 20 to 100 microns and greater; and the aspect ratio is about 1,000 to 40,000:1.

4. X-ray Structure—indicates that the silicon carbide is in crystal form, whereas the silica sheath is amorphous.

5. Surface Area—determined to be about 60 meters square per gram.

6. Bulk Density—the untreated fibers are about 0.0025 grams per cc.; the modified fibers (stearic acid) are about 0.036 grams per cc.

7. Specific Gravity—determined that the untreated fibers have a specific gravity of about 2.65.

The surface of the novel thickening agent is generally highly polar. This property is particularly desirable for dispersing the thickener in polar solvents. However, for nonpolar solvents the fibrous material will not readily disperse. It is therefore desirable to modify the surface of the fibers to obtain improved dispersion by subjecting the fibers to a treatment with a nonpolar material such as, for example, stearic acid. Thus for example the surface of the fibers could be modified as follows. Into 100 parts by weight of toluene, 1 part by weight of $SiO_2$–SiC fiber thickener is added and dispersed by means of a Waring blender. Then 0.01 part of stearic acid is added to the dispersed mixture and refluxed for 16 hours. Thereafter the fibers are filtered, washed with toluene and with acetone, and air dried.

The treated $SiO_2$–SiC fibers have changed surface characteristics from the originally high polar surface to a nonpolar surface. Thus the modified thickening agent can be more readily dispersed in nonpolar liquid and is somewhat more effective for these liquids. The treated fibers also have a greater bulk density which make the thickening agent easier to use. Another advantage of the treatment is that the fibers are provided with a lubricating surface which increases dispersion and reduces fracture of the fibers.

The usual effectiveness of the fibrous thickening agent may be attributed to the extremely high aspect ratio of the fibers. The aspect ratio of the fibers should generally be about greater than 1,000:1. It may be predicted on theoretical grounds that the viscosity of suspensions of particles in the forms of fibers or rods should be much more efficient than spherically shaped particles.

Typically the amount of the fibrous thickening agent useful in the range of about 0.01 to 2 percent by weight of the liquid. While a wide variety of fluids can be thickened with the fibrous thickening agent the efficiency is to a large extent related to the chemical nature of the fluid. The maximum efficiency is obtained in nonpolar vehicles such as hydrocarbons. Thus the viscosity of NUJOL mineral oil can be raised to that of a soft gel like state with only 0.2 percent by weight of the fibrous thickening agent. On the other hand a polar fluid, such as water, requires about 0.5 percent anhydrous hydrazine requires about 0.2 percent and hydrazine hydrate requires about 0.8 percent of the fibrous thickening agent to reach the same consistency.

In accordance with the method of the present invention, the required amount of fibrous thickening agent is dispersed in the liquid, be it polar or nonpolar, until the desired viscosity is obtained. The actual technique for mixing is conventional and various standard means may be used. The methods of dispersing the fibrous thickening agent may employ an impeller disperser which is a high speed turbine disperser most commonly used for incorporating thickening agents. A roller mill required in hard to disperse pigments or a pebble mill used when the fibrous thickening agent does not readily disperse in the liquid may also be used. Optionally, to increase the dispersibility of the fibrous thickening agent it may be desirable to "prewet" the fibers with a surfactant or to modify the fibrous surface as discussed hereinabove.

A particularly desirable property of the fibrous thickening agent is that it has extremely high efficiency and thus by the addition of minute amounts it will cause a considerable increase in the viscosity of the fluid to which it is added. This property finds particular use in the field of fuels, e.g., jet fuels and rocket fuels wherein it is desirable to have a minimum of contamination of the fuel composition. It has been reported in airline disasters that a major cause of death, in otherwise survivable accidents, has resulted in the explosion and fire caused by spilled fuel from damaged fuel tanks. A possible solution to the problem is the use of gelled fuels which are substantially less flammable than standard jet fuels and on tests have shown a much shorter flame duration. Within the type of fuels which can readily be gelled using my novel fibrous gelling agent are the hydrazines for use as propellants in liquid fueled rockets. While the term hydrazines is used generically, the novel thickener is particularly effective in thickening hydrazines, monomethylhydrazines and 1,2-dimethylhydrazines which are used in various blends for propulsion and control of rockets in aerospace applications.

My invention is further illustrated by the following examples.

EXAMPLE I

A silicone oil based grease was prepared having the following formulation.

| | Weight % |
|---|---|
| Fluorosilicone Oil | 98.0 |
| $SiO_2$—SiC Thickening Agent | 2.0 |

The properties of the grease were then determined by standard procedures and were found to be as follows:

| | |
|---|---|
| Penetration | 28.6 mm. |
| Separation 400° F., 24 hours | 6.2% |
| Dropping Point | 234° F. |
| Bearing Test (time to failure at 450° C.) | 148 hr. |
| Load Bearing Capacity | Same as Base Stock |

These results indicate that the $SiO_2$—SiC thickening agent can be used in preparing lubricating greases.

EXAMPLE II

Thixotropic paints were prepared by dispersing the $SiO_2$—SiC thickening agent in a typical oil based paint, DuPont 503 gray paint. The amount of thickener added is indicated as follows.

| Paint | Wt. % Thickener |
|---|---|
| A | None |
| B | 0.161 |
| C | 0.299 |

The dynamic viscosity at 19.5° C. as a function of shearing is recorded on the graph, FIG. 1. These results indicate that the addition of small amounts of the novel thickening agent imparts thixotropic properties to the paint.

EXAMPLE III

To determine the effect and efficiency of thickening agents on typical polar and nonpolar resin systems a series of experiments were performed. Various concentrations of thickening agents was dispersed in an epoxy resin (Araldite 507) and in a polyester resin (Polyresin P–283) and the viscosities at 19.5° C. of the resulting mixtures were determined. The results are shown in the graph, FIG. 2 in which the mixtures are identified as follows.

| | Epoxy | Polyester |
|---|---|---|
| $SiO_2$—SiC agent | Curve D | Curve DD |
| $SiO_2$—SiC agent modified (treated with stearic acid) | Curve E | Curve EE |
| Pyrolytic Silica | Curve F | Curve FF |

The results indicate that both the untreated and the modified $SiO_2$—SiC thickening agents are extremely efficient as thickeners for polar and nonpolar resins, as a matter of fact these are considerably more efficient than the pyrolytic silica. While the modified $SiO_2$—SiC thickening agent was slightly better than the untreated $SiO_2$—SiC thickening agent in the epoxy resin, the reverse was true for the polyester resin.

A comparison of the thixotropic properties of the mixtures indicated that both the untreated and the modified form of the $SiO_2$—SiC thickener were more effective than the pyrolytic silica in the epoxy system. However both the $SiO_2$—SiC thickeners were less effective than the pyrolytic silica in the polyester system.

EXAMPLES IV–VII

Following the procedure of Example II other thickened fluids were prepared as set forth hereinbelow. Various concentrations of the untreated and the modified $SiO_2$—SiC thickener were added to a silicone oil, a mineral oil and to an organic phosphonate and the viscosities at different shear rates determined. The results are given in the tables below.

EXAMPLE IV $SiO_2$—SiC thickener in Dow Corning 200 Silicone Oil
RELATIVE VISCOSITY IN CENTIPOISES AT 19.5° C.

SHEAR RATE

| Conc., weight percent | 1 r.p.m. | 2.5 r.p.m. | 5 r.p.m. | 10 r.p.m. | 20 r.p.m. | 50 r.p.m. | 100 r.p.m. |
|---|---|---|---|---|---|---|---|
| 0 | | 418 | 400 | 395 | 382 | 360 | |
| 0.022 | | 510 | 500 | 460 | | 430 | 450 |
| 0.14 | 6,500 | 4,000 | 2,800 | 2,100 | | 1,010 | 860 |
| 0.47 | Gel | Gel | Gel | 386,000 | | 10,000 | 8,500 |

EXAMPLE V $SiO_2$—SiC Thickener in NUJOL Mineral Oil

RELATIVE VISCOSITY IN CENTIPOISES AT 24° C.

SHEAR RATE

| Conc., weight percent | 1 r.p.m. | 2.5 r.p.m. | 5 r.p.m. | 10 r.p.m. | 20 r.p.m. | 50 r.p.m. | 100 r.p.m. |
|---|---|---|---|---|---|---|---|
| 0 | 250 | 240 | 220 | 210 | 205 | 212 | 215 |
| 0.048 | 2,100 | 1,320 | 940 | 710 | 560 | 420 | 365 |
| 0.096 | 9,500 | 5,480 | 3,780 | 2,590 | 1,680 | 1,054 | 810 |
| 0.153 | 22,400 | 11,800 | 7,540 | 4,560 | 2,860 | 1,620 | 1,005 |
| 0.195 | 37,400 | 19,600 | 12,560 | 7,880 | 4,850 | 2,436 | 1,628 |

EXAMPLE VI

Modified $SiO_2$—SiC Thickener (with Stearic Acid)

in NUJOL Mineral Oil

RELATIVE VISCOSITY IN CENTIPOISES AT 24° C.

6426

101029 0387

SHEAR RATE

| Conc., weight percent | 1 r.p.m. | 2.5 r.p.m. | 5 r.p.m. | 10 r.p.m. | 20 r.p.m. | 50 r.p.m. | 100 r.p.m. |
|---|---|---|---|---|---|---|---|
| 0 | 250 | 240 | 220 | 210 | 205 | 212 | 215 |
| 0.051 | 2,700 | 1,640 | 1,160 | 890 | 630 | 532 | 428 |
| 0.099 | 7,700 | 4,240 | 2,880 | 1,890 | 1,290 | 872 | 575 |
| 0.149 | 19,600 | 10,720 | 6,620 | 4,190 | 2,625 | 1,506 | 1,006 |
| 0.199 | 32,200 | 17,600 | 11,280 | 7,120 | 4,410 | 2,424 | 1,624 |

EXAMPLE VII $SiO_2$—SiC Thickener in Dioctyl phenylphosphonate

RELATIVE VISCOSITY IN CENTIPOISES AT 24° C.

SHEAR RATE

| Conc., weight percent | 2.5 r.p.m. | 5 r.p.m. | 10 r.p.m. | 20 r.p.m. | 50 r.p.m. | 100 r.p.m. |
|---|---|---|---|---|---|---|
| 0 | 48 | 48 | 48 | 48 | 53 | 54 |
| 0.05 | 304 | 226 | 173 | 134 | 100 | 98 |
| 0.10 | 1,150 | 760 | 504 | 348 | 206 | 156 |
| 0.15 | 2,048 | 1,376 | 928 | 614 | 342 | 239 |
| 0.20 | 3,720 | 2,520 | 1,710 | 1,120 | 628 | 395 |

I claim:

1. A method for increasing the viscosity of a polar or nonpolar liquid that is essentially chemically inert to silica and/or silicon carbide which comprises dispersing within said liquid submicroscopic-sized fibers consisting of a core of beta-silicon carbide and a surface sheath of silica in an amount of at least about 0.01 percent by weight of the liquid, said fibers having diameters averaging about 0.025 microns, lengths between about 20–100 microns, and aspect ratios ranging between about 1000-:1–40,000:1.

2. A method according to claim 1 wherein said fibers are present in an amount of about 0.01–2.0 percent by weight of the liquid.

3. A method according to claim 1 wherein prior to the dispersion of the fibers within the liquid the surfaces thereof are converted to a high nonpolar character through reaction with a nonpolar material.

4. A method according to claim 3 wherein said nonpolar material is stearic acid.

5. A method according to claim 1 wherein said nonpolar liquid is selected from the group consisting of monomethylhydrazine, 1,2-dimethylhydrazine, hydrazine, and mixtures thereof.

6. A composition of matter comprising a polar or nonpolar liquid that is essentially chemically inert to silica and/or silicon carbide with submicroscopic-sized fibers consisting of a core of beta-silicon carbide and a surface sheath of silica dispersed therein in an amount of at least about 0.01 percent by weight of the liquid, said fibers having diameters averaging about 0.025 microns, lengths between about 20–100 microns, and aspect ratios ranging between about 1000:1–40,000:1.

7. A composition of matter according to claim 6 wherein said fibers are present in an amount of about 0.01–2.0 percent by weight of the liquid.

8. A composition of matter according to claim 6 wherein the surfaces of said fibers have been made highly nonpolar through reaction with a nonpolar material.

9. A composition of matter according to claim 8 wherein said nonpolar material is stearic acid.

10. A composition of matter according to claim 6 wherein said nonpolar liquid is selected from the group consisting of monomethylhydrazine, 1,2-dimethylhydrazine, hydrazine, and mixtures thereof.

* * * * *